(12) United States Patent
Kim et al.

(10) Patent No.: US 11,336,207 B2
(45) Date of Patent: May 17, 2022

(54) HIGH-POWER SLIDING-MODE TRIBOELECTRIC GENERATOR HAVING TILTED-FACE STRUCTURE AND METHOD OF MANUFACTURING THE SAME

(71) Applicant: IUCF-HYU (Industry-University Cooperation Foundation Hanyang University), Seoul (KR)

(72) Inventors: Tae Whan Kim, Seoul (KR); Dong Chul Choo, Seongnam-si (KR)

(73) Assignee: IUCF-HYU (Industry-University Cooperation Foundation Hanyang University), Seoul (KR)

( * ) Notice: Subject to any disclaimer, the term of this patent is extended or adjusted under 35 U.S.C. 154(b) by 0 days.

(21) Appl. No.: 17/072,469

(22) Filed: Oct. 16, 2020

(65) Prior Publication Data

US 2021/0119554 A1 Apr. 22, 2021

(30) Foreign Application Priority Data

Oct. 17, 2019 (KR) .................. 10-2019-0128973

(51) Int. Cl.
  *H02N 1/04* (2006.01)
(52) U.S. Cl.
  CPC ..................... *H02N 1/04* (2013.01)
(58) Field of Classification Search
  CPC ............................................... H02N 1/04
  USPC ................................................. 310/309, 310
  See application file for complete search history.

(56) References Cited

U.S. PATENT DOCUMENTS

| 11,114,953 B2* | 9/2021 | Baik ................ H02N 1/04 |
| 2014/0338458 A1* | 11/2014 | Wang ................ G01H 11/06 |
| | | 73/658 |
| 2016/0065091 A1* | 3/2016 | Wang ................ H02N 1/04 |
| | | 310/300 |

(Continued)

FOREIGN PATENT DOCUMENTS

| KR | 10-2015-0134363 A | 12/2015 |
| KR | 10-1685182 B1 | 12/2016 |

(Continued)

OTHER PUBLICATIONS

Hyun-Woo Park et al., "Electron blocking layer-based interfacial design for highly-enhanced triboelectric nanogenerators", Elesevier, 2018, p. 9-15, Nano Energy 50.

(Continued)

*Primary Examiner* — Ahmed Elnakib
(74) *Attorney, Agent, or Firm* — Novick, Kim & Lee, PLLC; Jae Youn Kim

(57) ABSTRACT

Disclosed is a high-power sliding-mode triboelectric generator including a substrate; a positive electrode formed on the substrate; a positively charged body provided on the positive electrode and formed to be tilted at a predetermined angle from the substrate; a negatively charged body located to be opposite to the positively charged body and formed to be tilted at the same angle as in the positively charged body; a negative electrode provided on the negatively charged body and configured to support the negatively charged body; and at least one spacer formed between the positively charged body and the negatively charged body, is formed of an elastic body, and configured to maintain an interval between the positively charged body and the negatively charged body.

17 Claims, 8 Drawing Sheets

(56) References Cited

U.S. PATENT DOCUMENTS

2017/0331397 A1* 11/2017 Kim .................. H02N 2/18
2020/0127585 A1* 4/2020 Kim .................. D06N 7/0097
2020/0316366 A1* 10/2020 Wang ................ A61F 13/0273
2021/0119554 A1* 4/2021 Kim .................. H02N 1/04

FOREIGN PATENT DOCUMENTS

KR     10-1821585 B1    1/2018
KR     10-1885023 B1    8/2018
KR      101885023 B1 * 8/2018

OTHER PUBLICATIONS

Chang Kyu Jeong et al., "Topographically-Designed Triboelectric Nanogenerator via Block Copolymer Self-Assmbly", Nano Letters, Nov. 13, 2014, p. 7031-7038.

* cited by examiner

440

HIGH-POWER SLIDING-MODE TRIBOELECTRIC GENERATOR HAVING TILTED-FACE STRUCTURE AND METHOD OF MANUFACTURING THE SAME

CROSS-REFERENCE TO RELATED APPLICATION

This application claims priority to Korean Patent Application No. 10-2019-0128973, filed on Oct. 17, 2019 in the Korean Intellectual Property Office, the disclosure of which is incorporated herein by reference.

BACKGROUND OF THE DISCLOSURE

Field of the Disclosure

The present disclosure relates to a high-power sliding-mode triboelectric generator having a tilted-face structure and a method of manufacturing the same, and more particularly, to a high-power sliding-mode triboelectric generator including a positively charged body and a negatively charged body, the friction surfaces of the positively and negatively charged bodies being tilted to have a predetermined angle to generate frictional electricity.

Description of the Related Art

Triboelectric nanogenerators (TENGs) capable of converting mechanical energy into electrical energy are being actively researched and developed due to advantages such as high energy conversion efficiency, low manufacturing cost, and a simple and bendable structure and in that they can be manufactured using various materials. The performance of TENGs is greatly influenced by the amount of charge generated through friction and the efficiency of a process of separating positive and negative charges.

In general, two methods are applied to improve the performance of TENGs. First, there is a method of using an appropriate friction material containing significantly different polarities to increase the amount of charge generated in a friction process. Second, there is a method of manufacturing a friction layer to have a surface including a micro- or nano-structure, or surface-modifying to a nano-scale.

In particular, with regard to the first method, a sliding-mode triboelectric generator, wherein two different surfaces cause friction while sliding to generate an electrostatic potential difference and accordingly generate an induced current, has also been proposed.

However, a friction generator operating in a conventional CS mode (contact separation mode) for energy collection from vertical motion has a low power efficiency problem due to the principle of generating electric charge only when a positively charged body is in contact therewith.

On the other hand, a triboelectric generator operating in a sliding mode has a structure wherein electric charges are continuously generated while two charged bodies move, thereby increasing power efficiency. Accordingly, research on a triboelectric generator operating in a sliding mode is underway.

RELATED ART DOCUMENTS

Patent Documents

Korean Patent Application Publication No. 10-2015-0134363, "SLIDING FRICTIONAL NANO GENERATOR AND POWER GENERATION METHOD"

Korean Patent No. 10-1821585, "SLIDING-FRICTION POWER GENERATOR, POWER GENERATION METHOD AND VECTOR DISPLACEMENT SENSOR"

Korean Patent No. 10-1685182, "TRIBOELECTRIC GENERATOR AND METHOD FOR MANUFACTURING THE GENERATOR"

SUMMARY OF THE DISCLOSURE

Therefore, the present disclosure has been made in view of the above problems, and it is an object of the present disclosure to provide a high-power sliding-mode triboelectric generator that has a structure of collecting electric power in a reciprocating motion in which external force is applied and, accordingly, can provide improved power generation efficiency, compared to a conventional contact separation (CS)-mode triboelectric generator; and a method of manufacturing the high-power sliding-mode triboelectric generator.

It is another object of the present disclosure to provide a high-power sliding-mode triboelectric generator capable of continuously producing electric charge due to tilted faces therein during a reciprocating motion, compared to the CS mode triboelectric generator that generates electric charge only at the end of a reciprocating motion; and a method of manufacturing the high-power sliding-mode triboelectric generator.

It is yet another object of the present disclosure to provide a high-power sliding-mode triboelectric generator capable of being installed on the floor of a place, where there is a lot of foot or vehicle traffic, to collect electric power; and a method of manufacturing the high-power sliding-mode triboelectric generator.

In accordance with an aspect of the present invention, the above and other objects can be accomplished by the provision of a high-power sliding-mode triboelectric generator, including: a substrate; a positive electrode formed on the substrate and configured to transfer positive charges generated due to friction to a load; a positively charged body provided on the positive electrode, formed to be tilted at a predetermined angle from the substrate, configured to move in a plane direction of the substrate, and configured to transfer the positive charges generated due to the friction to the positive electrode; a negatively charged body located to be opposite to the positively charged body, formed to be tilted at the same angle as in the positively charged body, and, when rubbed against the positively charged body due to external force, configured to maintain contact with the positively charged body through a difference between a direction of the external force and the tilted friction direction to continuously generate negative charges while friction occurs; a negative electrode provided on the negatively charged body, configured to support the negatively charged body, and configured to transfer the negative charges, generated in the negatively charged body due to the friction, to a load; and at least one spacer formed between the positively charged body and the negatively charged body, is formed of an elastic body, and configured to maintain an interval between the positively charged body and the negatively charged body.

According to an embodiment, positions of the positively charged body and the negatively charged body may be restored to initial positions thereof though the spacer, and potential energy of the restored positively and negatively charged bodies and elastic energy of the spacer may be converted into electrical energy.

According to an embodiment, the high-power sliding-mode triboelectric generator may further include a first functional layer provided between the positively charged body and the positive electrode and configured to prevent loss of the positive charges.

According to an embodiment, the high-power sliding-mode triboelectric generator may further include a second functional layer provided between the negatively charged body and the negative electrode and configured to prevent loss of the negative charges.

According to an embodiment, the positively charged body may include at least one of glass, mica, nylon, wool, fur, lead, silk, aluminum, paper, cotton, steel, wood, amber, epoxy, nickel, copper, silver, gold, and sulfur.

According to an embodiment, the negatively charged body may include at least one of silicon rubber, Teflon, polydimethylsiloxane, polyvinyl chloride, polyethylene terephthalate, polypropylene, polyethylene, polyurethane, cellophane tape, polystyrene, saran, polyvinyl alcohol, and polymethylmethacrylate.

According to an embodiment, the negatively charged body may include at least one of graphene, graphene oxide, $MoS_2$, $MoSe_2$, $WS_2$, and $WSe_2$, and serves to trap negative charges of the negatively charged body.

According to an embodiment, a range of the angle may include a range of 30 to 70 degrees.

According to an embodiment, the spacer may include an elastic member.

In accordance with another aspect of the present invention, there is provided a method of manufacturing a high-power sliding-mode triboelectric generator, the method including; forming a substrate; forming a positive electrode formed on the substrate and configured to transfer positive charges generated due to friction to a load; forming a positively charged body provided on the positive electrode, formed to be tilted at a predetermined angle from the substrate, configured to move in a plane direction of the substrate, and configured to transfer the positive charges generated due to friction to the positive electrode; forming a negatively charged body located to be opposite to the positively charged body, formed to be tilted at the same angle as in the positively charged body, and, when rubbed against the positively charged body due to external force, configured to maintain contact with the positively charged body through a difference between a direction of the external force and the tilted friction direction to continuously generate negative charges while friction occurs; forming a negative electrode provided on the negatively charged body, configured to support the negatively charged body, and configured to transfer the negative charges, generated in the negatively charged body due to the friction, to a load; and forming at least one spacer formed between the positively charged body and the negatively charged body, is formed of an elastic body, and configured to maintain an interval between the positively charged body and the negatively charged body.

According to an embodiment, positions of the positively charged body and the negatively charged body may be restored to initial positions thereof though the spacer, and potential energy of the restored positively and negatively charged bodies and elastic energy of the spacer may be converted into electrical energy.

According to an embodiment, the positively charged body may include at least one of glass, mica, nylon, wool, fur, lead, silk, aluminum, paper, cotton, steel, wood, amber, epoxy, nickel, copper, silver, gold, and sulfur.

According to an embodiment, the negatively charged body may include at least one of silicon rubber, Teflon, polydimethylsiloxane, polyvinyl chloride, polyethylene terephthalate, polypropylene, polyethylene, polyurethane, cellophane tape, polystyrene, saran, polyvinyl alcohol, and polymethylmethacrylate.

According to an embodiment, the negatively charged body may include at least one of graphene, graphene oxide, $MoS_2$, $MoSe_2$, $WS_2$, and $WSe_2$, and serves to trap negative charges of the negatively charged body.

According to an embodiment, a range of the angle may include a range of 30 to 70 degrees.

In accordance with another aspect of the present invention, there is provided a method of operating a high-power sliding-mode triboelectric generator, the method including: maintaining a distance between a positively charged body, under which a positive electrode is connected and which is formed to be tilted at a predetermined angle on a substrate, and a negatively charged body on which a negative electrode is connected; applying external force in a direction perpendicular to the substrate such that the positively charged body and the negatively charged body are disposed to be close to each other; sliding the positively charged body and the negatively charged body while maintaining contact therebetween according to the applied external force; continuously generating frictional force, generated in the sliding process, as positive charges and negative charges in the positively charged body and the negatively charged body, respectively; and transferring the converted positive charges and negative charges to an external circuit for charging.

According to an embodiment, the positively charged body may include at least one of glass, mica, nylon, wool, fur, lead, silk, aluminum, paper, cotton, steel, wood, amber, epoxy, nickel, copper, silver, gold, and sulfur, and the negatively charged body may include at least one of silicon rubber, Teflon, polydimethylsiloxane, polyvinyl chloride, polyethylene terephthalate, polypropylene, polyethylene, polyurethane, cellophane tape, polystyrene, saran, polyvinyl alcohol, and polymethylmethacrylate.

In accordance with yet another aspect of the present invention, there is provided a high-power sliding-mode triboelectric generator, including: a substrate; a positive electrode formed in a spiral shape to be tilted at a predetermined angle on the substrate and configured to transfer positive charges generated due to friction to a load; a positively charged body provided on the positive electrode, configured to rotate in a spiral direction when compressed by external force, and configured to transfer the positive charges generated due to friction to the positive electrode; a negatively charged body located to be opposite to the positively charged body, formed in a spiral shape at the same angle as in the positively charged body, configured to perform a spiral motion while rubbing against the positively charged body by external force, and configured to generate negative charges while maintaining contact with the positively charged body during the spiral motion; a negative electrode provided on the negatively charged body, configured to support the negatively charged body, and configured to transfer the negative charges, generated in the negatively charged body due to the friction, to a load; and at least one spacer formed between the positively charged body and the negatively charged body, is formed of an elastic body, and configured to maintain an interval between the positively charged body and the negatively charged body.

According to an embodiment, positions of the positively charged body and the negatively charged body may be restored to initial positions thereof though the spacer, and potential energy of the restored positively and negatively charged bodies and elastic energy of the spacer may be converted into electrical energy.

According to an embodiment, the high-power sliding-mode triboelectric generator may further include a first functional layer provided between the positively charged body and the positive electrode and configured to prevent loss of the positive charges; and a second functional layer provided between the negatively charged body and the negative electrode and configured to prevent loss of negative charges.

According to an embodiment, a range of the angle may include a range of 30 to 70 degrees.

According to an embodiment, a friction surface of each of the positively charged body and the negatively charged body may include a nanostructure, the included nanostructure serving to increase a friction surface area.

According to an embodiment, the nanostructure may be formed artificially or by a self-assembly method.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION OF THE DISCLOSURE

Figure 1:
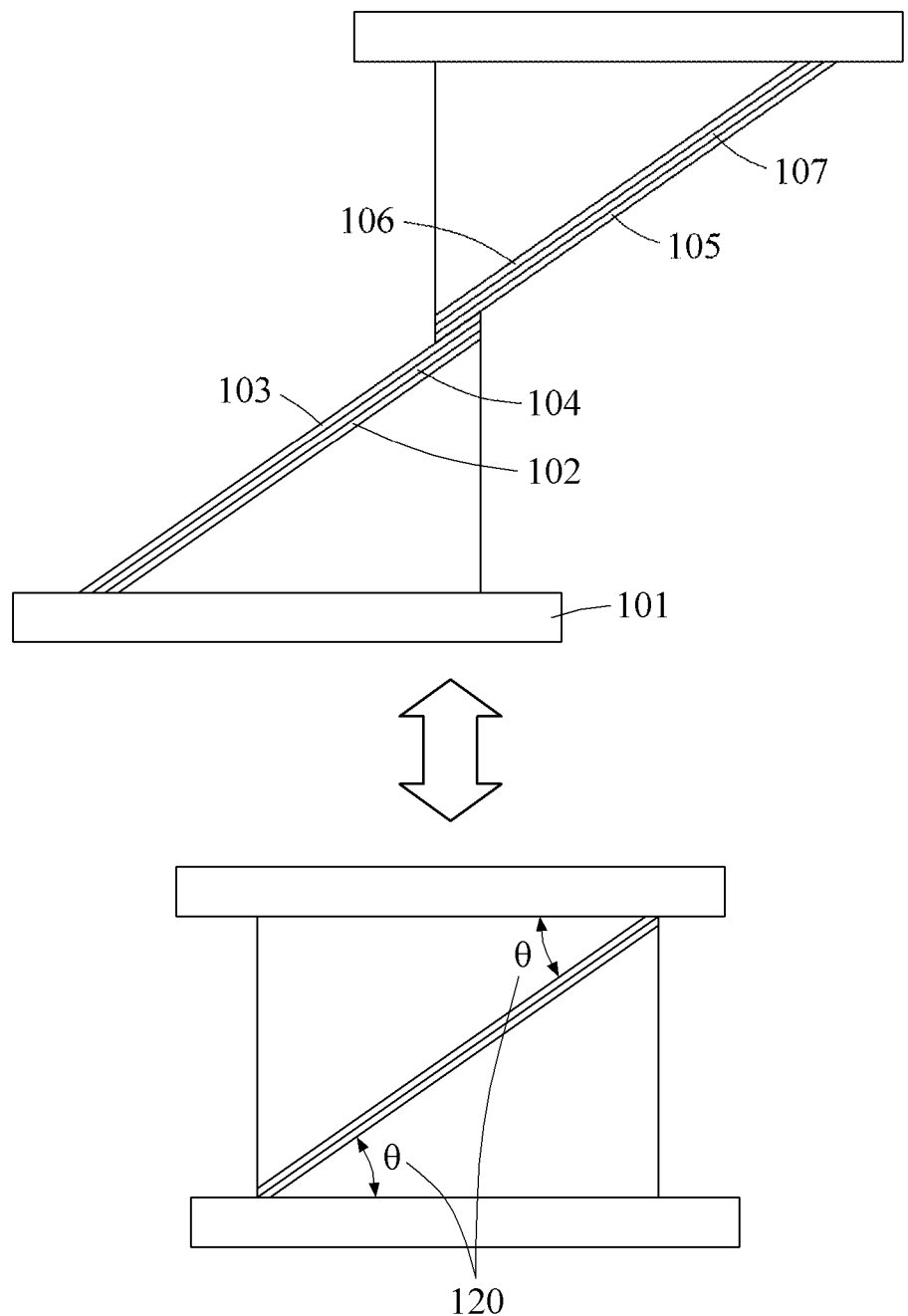
FIG. 1 illustrates an overall operation of a high-power sliding-mode triboelectric generator according to an embodiment of the present disclosure.

Specific structural and functional descriptions of embodiments according to the concept of the present disclosure disclosed herein are merely illustrative for the purpose of explaining the embodiments according to the concept of the present disclosure. Furthermore, the embodiments according to the concept of the present disclosure can be implemented in various forms and the present disclosure is not limited to the embodiments described herein.

The embodiments according to the concept of the present disclosure may be implemented in various forms as various modifications may be made. The embodiments will be described in detail herein with reference to the drawings. However, it should be understood that the present disclosure is not limited to the embodiments according to the concept of the present disclosure, but includes changes, equivalents, or alternatives falling within the spirit and scope of the present disclosure.

The terms such as "first" and "second" are used herein merely to describe a variety of constituent elements, but the constituent elements are not limited by the terms. The terms are used only for the purpose of distinguishing one constituent element from another constituent element. For example, a first element may be termed a second element and a second element may be termed a first element without departing from the scope of rights according to the concept of the present invention.

It will be understood that when an element is referred to as being "on", "connected to" or "coupled to" another element, it may be directly on, connected or coupled to the other element or intervening elements may be present. In contrast, when an element is referred to as being "directly on," "directly connected to" or "directly coupled to" another element or layer, there are no intervening elements or layers present. Other words used to describe the relationship between elements should be interpreted in a like fashion (e.g., "between," versus "directly between," "adjacent," versus "directly adjacent," etc.).

The terms used in the present specification are used to explain a specific exemplary embodiment and not to limit the present inventive concept. Thus, the expression of singularity in the present specification includes the expression of plurality unless clearly specified otherwise in context. Also, terms such as "include" or "comprise" in the specification should be construed as denoting that a certain characteristic, number, step, operation, constituent element, component or a combination thereof exists and not as excluding the existence of or a possibility of an addition of one or more other characteristics, numbers, steps, operations, constituent elements, components or combinations thereof.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The present disclosure will now be described more fully with reference to the accompanying drawings, in which exemplary embodiments of the invention are shown. This disclosure may, however, be embodied in many different forms and should not be construed as limited to the exemplary embodiments set forth herein. Like reference numerals in the drawings denote like elements.

FIG. 1 illustrates an overall operation of a high-power sliding-mode triboelectric generator 100 according to an embodiment of the present disclosure.

The high-power sliding-mode triboelectric generator according to an embodiment of the present disclosure includes a substrate 101; a positive electrode 102 formed on the substrate 101; a positively charged body 103 provided on the positive electrode 102 and tilted at the predetermined angle 120 from the substrate 101; a negatively charged body 105 located to be opposite to the positively charged body 103 and tilted at the same angle 120 as in the positively charged body 103; a negative electrode 106 provided on the negatively charged body 105 and configured to support the negatively charged body 105; and at least one spacer formed between the positively charged body 103 and the negatively charged body 105, formed of an elastic body, and configured to maintain a gap between the positively charged body 103 and the negatively charged body 105.

In addition, the substrate 101 may support the positive electrode 102 and the positively charged body 103, and the positive electrode 102 and the positively charged body 103 may be formed to be tilted at the predetermined angle 120 from the substrate 101.

The substrate 101 may be connected to the spacer, thereby maintaining a gap between the positively charged body 103 and the negatively charged body 105 at a regular interval.

The substrate 101 may be formed to have a flat surface shape, or may not have a flat surface shape despite including a flat surface.

The substrate 101 may be a metal substrate or a polymer substrate. For example, the substrate 101 may include a hard material such as a silicon wafer or glass, but the present disclosure is not limited thereto. The substrate 101 may include a flexible material such as polyethylene terephthalate (PET), polyester (PE), polyester sulfone (PES), polyethylene naphthalate (PEN) or Kapton.

According to an embodiment, the substrate 101 may be used as the positively charged body 103.

The positive electrode 102 according to an embodiment of the present disclosure may be formed on the substrate 101 and may include a material having excellent electrical conductivity.

The positive electrode 102 may include at least one of graphene, carbon nanotubes (CNT), indium tin oxide (ITO), a metal and a conductive polymer. Here, the metal may include, for example, at least one of Ag, Al, Cu, Au, Ni, Cr and Pt, but the present disclosure is not limited thereto.

In addition, the positive electrode 102 may be formed in a single-layer structure or a multi-layer structure.

The high-power sliding-mode triboelectric generator 100 according to an embodiment of the present disclosure may include the positively charged body 103 provided on the positive electrode 102 and tilted at the predetermined angle 120 from the substrate 101.

The positively charged body 103 may include at least one of glass, mica, nylon, wool, fur, lead, silk, aluminum, paper, cotton, steel, wood, amber, epoxy, nickel, copper, silver, gold and sulfur, but the present disclosure is not limited thereto.

The positively charged body 103 may rub against the negatively charged body 105 by external force to generate frictional electricity. Here, the positively charged body 103 may be provided between the positive electrode 102 and the negative electrode 106 and may include a polymer material and a nanomaterial.

The number of positive charges generated in the positively charged body 103 may be controlled by adjusting the thickness and area of the positively charged body 103. In addition, the number of positive charges generated in the positively charged body 103 may be controlled by adjusting an angle tilted from the substrate 101.

Here, the angle 120 may include a range of 30 to 70 degrees, preferably a range of 45 to 55 degrees in which energy collection efficiency is highest.

More particularly, as the thickness of the positively charged body 103 increases, more positive charges may be generated and trapped, and the number of positive charges generated in the positively charged body 103 due to friction may increase.

In addition, the positively charged body 103 may be provided between the positive electrode 102 and the positively charged body 103, and may further include a first functional layer for preventing loss of positive charges.

The first functional layer 104 may prevent loss of positive charges generated inside the positively charged body 103 and on a surface thereof due to friction between the positively charged body 103 and the negatively charged body 105.

In addition, the first functional layer 104 may increase a moving efficiency of positive charges, generated in the positively charged body 103 due to friction between the positively charged body 103 and the negatively charged body 105, to the positive electrode 102 connected to the positively charged body 103.

Strong positive charge trapping property and a large surface area of the first functional layer 104 may prevent positive charges in the positively charged body 103 from being leaking and being lost to the outside in a process in which the positively charged body 103 generates positive charges due to friction, and may improve the efficiency of the triboelectric generator by reducing leaked positive charges.

The first functional layer 104 may include at least one of a polymer material and a nanomaterial.

The polymer material may include at least one of polytetrafluoroethylene, polydimethylsiloxane, polyvinyl chloride, polyimide, polypropylene and polystyrene.

The nanomaterial may include at least one of nanoparticles, single-layer crystals, multilayer crystals, quantum dots, core-shell quantum dots, nanowires, nanoripples, nanotubes, nanorods, nanosheets, nanofibers, aerogels and nanofoams.

The single-layer crystals and multilayer crystals may include at least one of molybdenum disulfide ($MoS_2$), molybdenum diselenide ($MoSe_2$), boron nitride (BN), graphene, molybdenum telluride (MoTe), mica, molybdenum ditelluride ($MoTe_2$) and black phosphorus.

The quantum dots may include at least one of Si, Ge, GaAs, InP, InAs, AlAs, InSb, $AlGa_xAs_{1-x}$, $InGa_xAs_{1-x}$, CdSe, CdTe, ZnSe, ZnTe, $CdTe_xSe_{1-x}$, HgTe, $HgCd_xTe_{1-x}$, ZnO, GaN, $Al_xGa_{1-x}N$, $SnO_2$, CuO, $Cu_2O$, $C_6O$, $Cu_2ZnSnS_4$, $CuInS_2$, $SrTiO_3$, $BaTiO_3$, $(Ga_{1-x}Mn_x)N$, $(In_{1-x}Mn_x)N$, $CsPbCl_3$, and CdTe/ZnTe.

The core-shell quantum dots may include at least one of CdSe/CdTe, CdSe/CdS, InP/GaAs, $CuInS_4$/ZnTe, $CuInS_2$/CdS, CdSe/ZnS, $Cd_{1-x}Zn_xTe$/ZnTe, GaAs/Si, ZnSe/GaAs, $CuInS_2$/ZnS, Si/$Si_xGe_{1-x}$, Au/$SiO_2$, InAs/GaAs, InP/GaAs/InAs and CdSe/CdS/ZnS.

The nanowires may include at least one of $CeO_2$, CdTe, ZnTe, $SiO_2$, $Al_2O_3$, ZnO, GaN, $TiO_2$, $SnO_2$, CuO, $CuO_2$ and $CH_3NH_3PbI_3$.

The nanorods may include at least one of $CeO_2$, CdTe, ZnTe, ZnO, GaN, $TiO_2$, $SnO_2$, $Cu_xO$ and $CuO_2$.

The nanoripples may include at least one of $CeO_2$, CdTe, ZnTe, ZnO, GaN, $TiO_2$, $SnO_2$, $Cu_xO$ and $CuO_2$.

The nanotubes may include at least one of $CeO_2$, CdTe, ZnTe, ZnO, GaN, $TiO_2$, $SnO_2$, $Cu_xO$ and $CuO_2$.

The high-power sliding-mode triboelectric generator 100 according to an embodiment of the present disclosure may be located to be opposite to the positively charged body 103 and may include the negatively charged body 105 tilted at the same angle as in the positively charged body 103.

The negatively charged body 105 may include at least one of silicon rubber, Teflon, polydimethylsiloxane, polyvinyl chloride, polyethylene terephthalate, polypropylene, polyethylene, polyurethane, cellophane tape, polystyrene, saran, polyvinyl alcohol, and polymethylmethacrylate, but the present disclosure is not limited thereto.

In addition, the negatively charged body 105 may include at least one of graphene, graphene oxide, $MoS_2$, $MoSe_2$, $WS_2$, and $WSe_2$ and may trap negative charges of the negatively charged body 105.

The negatively charged body 105 may rub against the positively charged body due to external force to generate frictional electricity. Here, the negatively charged body 105 may be provided between the positive electrode and a negative electrode and may include a polymer material and a nanomaterial.

The number of negative charges generated by the negatively charged body 105 may be controlled by the thickness and area of the negatively charged body. In addition, the negatively charged body 105 may control the number of negative charges generated through adjustment of an angle tilted from the substrate 101.

More particularly, as the thickness of the negatively charged body 105 increases, more negative charges may be generated and trapped and the number of negative charges generated in the positively charged body 103 due to friction may increase.

In addition, the negatively charged body 105 may be provided between the negative electrode 106 and the positively charged body 103 and may further include a second functional layer 107 for preventing loss of negative charges.

The second functional layer 107 may prevent loss of positive charges generated inside the negatively charged body and on a surface thereof due to friction between the positively charged body 103 and the negatively charged body 105.

In addition, the second functional layer 107 may increase a moving efficiency of negative charges, generated in the negatively charged body 105 due to friction between the positively charged body 103 and the negatively charged body 105, to the negative electrode connected to the positively charged body 103.

Strong negative charge trapping property and a large surface area of the second functional layer 107 may prevent negative charges in the negatively charged body 105 from being leaking and being lost to the outside in a process in which the negatively charged body 105 generates negative charges due to friction, and may improve the efficiency of the triboelectric generator 100 by reducing leaked negative charges.

The second functional layer 107 may include at least one of a polymer material and a nanomaterial.

The polymer material may include at least one of polytetrafluoroethylene, polydimethylsiloxane, polyvinyl chloride, polyimide, polypropylene and polystyrene.

The nanomaterial may include at least one of nanoparticles, single-layer crystals, multilayer crystals, quantum dots, core-shell quantum dots, nanowires, nanoripples, nanotubes, nanorods, nanosheets, nanofibers, aerogels and nanofoams.

The single-layer crystals and multilayer crystals may include at least one of molybdenum disulfide ($MoS_2$), molybdenum diselenide ($MoSe_2$), boron nitride (BN), graphene, molybdenum telluride (MoTe), mica, molybdenum ditelluride ($MoTe_2$) and black phosphorus.

The quantum dots may include at least one of Si, Ge, GaAs, InP, InAs, AlAs, InSb, $AlGa_xAs_{1-x}$, $InGa_xAs_{1-x}$, CdSe, CdTe, ZnSe, ZnTe, $CdTe_xSe_{1-x}$, HgTe, $HgCd_xTe_{1-x}$, ZnO, GaN, $Al_xGa_{1-x}N$, $SnO_2$, CuO, $Cu_2O$, $C_6O$, $Cu_2ZnSnS_4$, $CuInS_2$, $SrTiO_3$, $BaTiO_3$, $(Ga_{1-x}Mn_x)N$, $(In_{1-x}Mn_x)N$, $CsPbCl_3$, and CdTe/ZnTe.

The core-shell quantum dots may include at least one of CdSe/CdTe, CdSe/CdS, InP/GaAs, $CuInS_4$/ZnTe, $CuInS_2$/CdS, CdSe/ZnS, $Cd_{1-x}Zn_xTe$/ZnTe, GaAs/Si, ZnSe/GaAs, $CuInS_2$/ZnS, $Si/Si_xGe_{1-x}$, $Au/SiO_2$, InAs/GaAs, InP/GaAs/InAs and CdSe/CdS/ZnS.

The nanowires may include at least one of $CeO_2$, CdTe, ZnTe, $SiO_2$, $Al_2O_3$, ZnO, GaN, $TiO_2$, $SnO_2$, CuO, $CuO_2$ and $CH_3NH_3PbI_3$.

The nanorods may include at least one of $CeO_2$, CdTe, ZnTe, ZnO, GaN, $TiO_2$, $SnO_2$, $Cu_xO$ and $CuO_2$.

The nanoripples may include at least one of $CeO_2$, CdTe, ZnTe, ZnO, GaN, $TiO_2$, $SnO_2$, $Cu_xO$ and $CuO_2$.

The nanotubes may include at least one of $CeO_2$, CdTe, ZnTe, ZnO, GaN, $TiO_2$, $SnO_2$, $Cu_xO$ and $CuO_2$.

The high-power sliding-mode triboelectric generator 100 according to an embodiment of the present disclosure may include at least one spacer formed between the positively charged body 103 and the negatively charged body 105, is formed of an elastic body, and is configured to maintain a gap between the positively charged body 103 and the negatively charged body 105.

The spacer may be formed of a spring or a polymer material and may have an appropriate length to separate the negatively charged body and the positively charged body from each other.

Preferably, for example, the spacer may be a spring and at least one spacer may be provided at an edge between the positively charged body 103 and the negatively charged body 105.

With regard to the phenomenon of triboelectric power generation through contact and friction, positive charge is induced on one surface and negative charge is induced on the other surface due to contact charging when two different surfaces come into contact.

In addition, when the two surfaces are separated, a potential difference is created by the previously induced charge, and the flow of electrons between the electrodes connected to the two surfaces is induced to reach equilibrium.

In addition, when the two surfaces are brought back close together after reaching equilibrium, a potential difference opposite to the previous potential difference is formed and electron flow in a direction opposite to the previous electron flow direction is induced. Based on such an operation principle, repeated contact and separation of the two surfaces cause repetitive generation of the voltage and current.

Here, electrons may refer to negative charges, and holes may refer to positive charges.

In the case of the high-power sliding-mode triboelectric generator according to an embodiment of the present disclosure, there is no potential difference between the positive electrode 102 and the negative electrode 106 in a basic state, so that a surface of each of the negatively charged body 105 and the positively charged body 103 is maintained in a state in which there is no electric charge.

However, when external force is applied to the high-power sliding-mode triboelectric generator 100 according to an embodiment of the present disclosure so that the negatively charged body 105 and the positively charged body 103 rub against each other, electric charges may move to a surface of each of the negatively charged body 105 and the positively charged body 103 by the frictional electricity effect due to friction.

According to the frictional electricity generation process, the negatively charged body has strong frictional negative polarity, and negative charge and positive charge may be respectively induced on a surface of the negatively charged body and a surface of the positively charged body.

In addition, when the negatively charged body 105 and the positively charged body 103 of the high-power sliding-mode triboelectric generator 100 according to an embodiment of the present disclosure are spaced apart from each other again, the dipole moment becomes stronger, and a strong potential difference may be generated between the positive electrode 102 and the negative electrode 106.

Accordingly, negative charges flow from a negative potential to a positive potential so that the triboelectric generator 100 operates.

In addition, negative charges and positive charges may be respectively generated due to friction between the positively charged body 103 and the negatively charged body 105, the negative charges generated in the negatively charged body 105 may move to the negative electrode 106 connected to the negatively charged body 105, and the positive charges generated in the positively charged body 103 may move to the positive electrode 102 connected to the positively charged body 103.

In addition, the positively charged body 103 and the negatively charged body 105 that have been rubbed against each other due to external force are restored to original (initial) positions thereof through the spacer to convert the potential energy of the restored positively charged body 103 and negatively charged body 105 and the elastic energy of the spacer into electrical energy.

The sliding-mode triboelectric generator 100 according to an embodiment of the present disclosure may be applied to a self-powered electronic device or a wearable device.

The high-power sliding-mode triboelectric generator 100 according to an embodiment of the present disclosure may further include at least one horizontal spacer formed on one side of at least one of the positively charged body 103 and the negatively charged body 105, formed of an elastic body, and configured to maintain a friction surface area between the positively charged body 103 and the negatively charged body 105.

The horizontal spacer may be made of a spring or a polymer material and may have an appropriate length to maintain a friction surface area between the negatively charged body 105 and the positively charged body 103.

For example, preferably, the spacer may be a spring and may be formed on one side of at least one of the positively charged body 103 and the negatively charged body 105, and at least one spacer may be provided at an edge between the positively charged body 103 and the negatively charged body 105.

In addition, the horizontal spacer may restore a contact area between the positively charged body 103 and the negatively charged body 105 to a minimum contact area and may constantly maintain the contact area so as to generate frictional electricity again when the contact area between the positively charged body 103 and the negatively charged body 105 maximally increases after frictional electricity between the positively charged body 103 and the negatively charged body 105 is generated.

In addition, the horizontal spacer may horizontally change a position of at least one of the positively charged body 103 and the negatively charged body 105 with respect to the substrate 101.

The horizontal spacer may restore at least one of the positively charged body 103 and the negatively charged body 105 to an initial position in a horizontal direction with respect to the substrate 101 through the restoring force of the horizontal spacer so as to cause generation of frictional electricity due to friction and cause friction again after the frictional electricity generation.

Accordingly, the spacer may restore the positively charged body 103 and the negatively charged body 105 to initial positions in a vertical direction with respect to the substrate 101, and the horizontal spacer may restore the positively charged body 103 and the negatively charged body 105 to initial positions in a horizontal direction.

Accordingly, the positions of the positively charged body 103 and the negatively charged body 105 of the high-power sliding-mode triboelectric generator 100 according to an embodiment of the present disclosure may be restored to original (initial) positions through the spacer and the horizontal spacer, and the potential energy of the restored positively charged body 103 and negatively charged body 105 and the elastic energy of the spacer may be converted into electrical energy.

The method of manufacturing the high-power sliding-mode triboelectric generator according to an embodiment of the present disclosure may include forming a substrate. In addition, a positive electrode may be formed on the substrate and may transfer positive charge generated due to friction to a load.

In addition, a positively charged body may be formed on the positive electrode. In particular, the positively charged body may be formed to be tilted at a predetermined angle from the substrate and may be position-changed in a plane direction of the substrate. The positively charged body may transfer positive charges generated due to friction to the positive electrode.

In addition, a negatively charged body may be formed to be opposite to the positively charged body. In particular, the negatively charged body may be formed to be tilted at the same angle as in the positively charged body, and, when rubbed against the positively charged body by external force, may maintain contact with the positively charged body through a difference between the direction of the external force and a tilted friction direction, thereby continually generating negative charges while friction occurs.

A negative electrode may be provided on the negatively charged body. The negative electrode serves to support the negatively charged body and transfer negative charges, generated due to friction in the negatively charged body, to a load.

In addition, at least one spacer may be formed between the positively charged body and the negatively charged body. The spacer may be formed of an elastic body and may be configured to maintain an interval between the positively charged body and the negatively charged body.

The positions of the positively charged body and the negatively charged body according to an embodiment of the present disclosure may be restored to initial positions through the spacer, and the potential energy of the restored positively and negatively charged bodies and the elastic energy of the spacer may be converted into electrical energy.

The method of operating the high-power sliding-mode triboelectric generator according to an embodiment of the present disclosure includes applying external force in a direction perpendicular to the substrate such that a contact area between the positively charged body and the negatively charged body is changed. Here, contact between the positively charged body and the negatively charged body may be maintained due to a difference between the external force direction and the friction direction, which is tilted at the predetermined angle, through the applied external force, and the positively and negatively charged bodies may slide in a direction in which the contact area therebetween increases.

In addition, frictional force is continuously converted into positive charges and negative charges while frictional force is generated in the sliding process, and the converted positive charges and negative charges are transferred to an external circuit for charging.

By the method of operating the high-power sliding-mode triboelectric generator according to an embodiment of the present disclosure, a distance between the positively charged body, under which the positive electrode is connected and which is tilted at the predetermined angle on the substrate, and the negatively charged body, on which the negative electrode is connected, may be maintained, and external force may be applied such that the positively charged body and the negatively charged body are disposed to be close to each other in a direction perpendicular to the substrate.

In addition, the positively charged body and the negatively charged body may slide according to the applied external force while maintaining contact therebetween, and frictional force generated in the sliding process may be continuously generated as positive charges and negative charges in the positively charged body and the negatively charged body, respectively.

In addition, the converted positive charges and negative charges may be transferred to an external circuit for charging.

Figure 2:
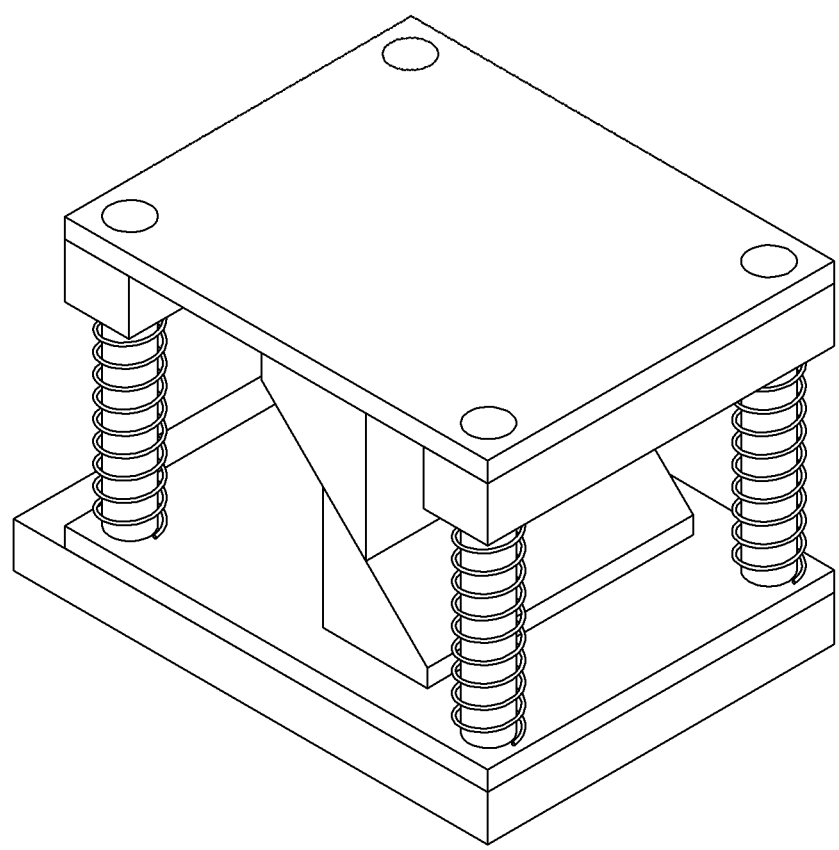
FIG. 2 illustrates an image of a high-power sliding-mode triboelectric generator according to an embodiment of the present disclosure.

FIG. 2 illustrates an image of a high-power sliding-mode triboelectric generator 200 according to an embodiment of the present disclosure.

In particular, FIG. 2 illustrates an image of a high-power sliding-mode triboelectric generator 200 including a single tilted surface. The high-power sliding-mode triboelectric generator 200 has a free standing mode (FT-mode) of sliding modes for triboelectric generators.

Here, the FT-mode structure of the high-power sliding-mode triboelectric generator according to an embodiment of the present disclosure is characterized in that a positive electrode and a negative electrode are provided in any one of a positively charged body and a negatively charged body.

For example, referring to FIG. 2, an upper charged body is formed of Teflon that is one of materials of the negatively charged body, and a lower charged body is formed of copper that is one of materials of the positively charged body.

In addition, referring to FIG. 2, the lower charged body may include both a positive electrode and a negative electrode, and the upper charged body may exclude an electrode.

Figure 3:
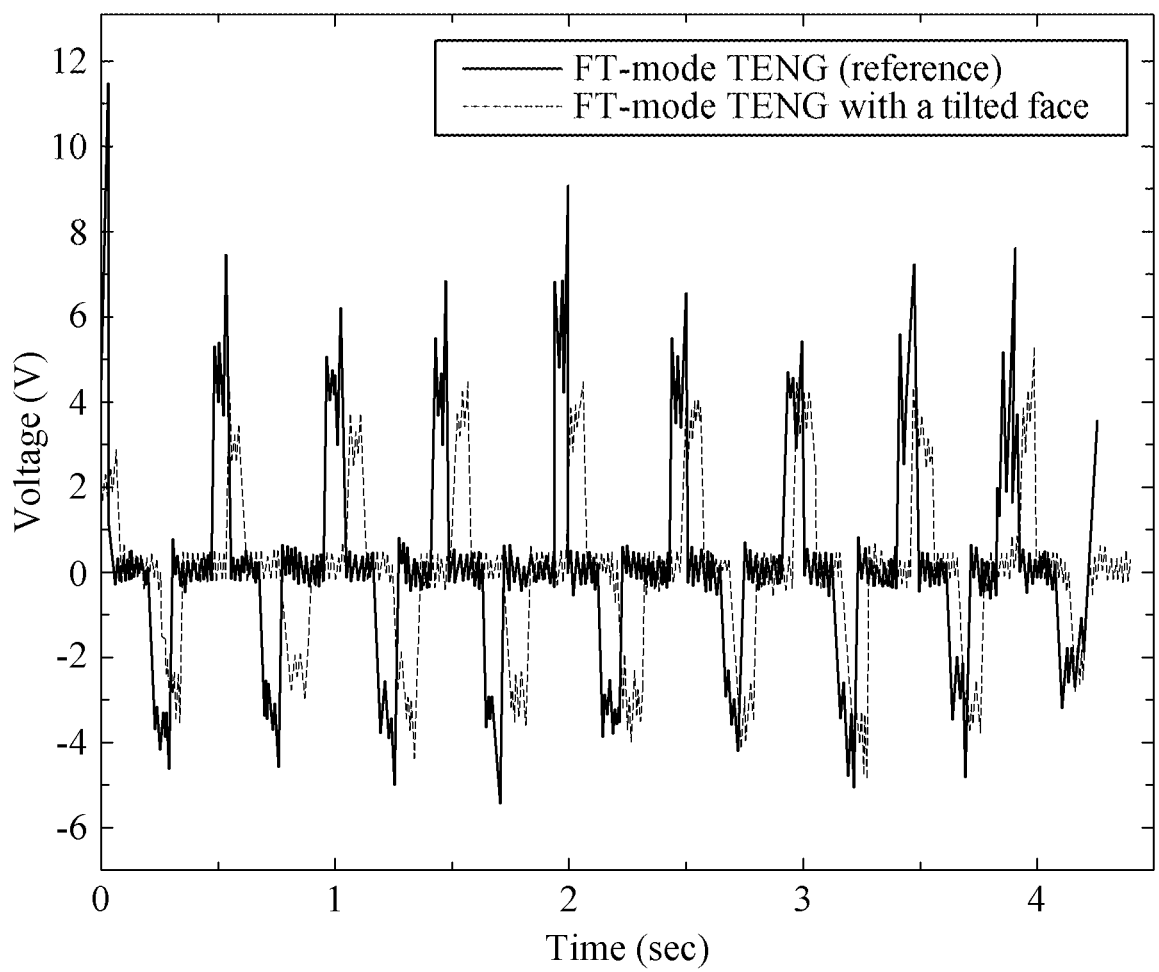
FIG. 3 illustrates an output voltage graph of a high-power sliding-mode triboelectric generator according to an embodiment of the present disclosure.

FIG. 3 illustrates an output voltage graph of a high-power sliding-mode triboelectric generator according to an embodiment of the present disclosure.

In particular, FIG. 3 illustrates an output voltage graph of the FT mode structure of the high-power sliding-mode triboelectric generator.

In addition, an output voltage graph of an FT mode structure (FT-mode TENG, reference) having a plane structure when an angle of a friction surface on which friction between the positively charged body and the negatively charged body structure occurs is 90 degrees from the substrate, and an output voltage graph of an FT mode structure (FT-mode TENG with tilted face) having a tilted-face structure when an angle of a friction surface on which friction between the positively charged body and the negatively charged body occurs is less than 90 degrees from the substrate are illustrated.

Since a conventional triboelectric generator operating in a CS mode generates electric charge only when upper and lower charged bodies are in contact, output voltage does not occur while a charged body moves, so that power efficiency is low.

However, in the case of the sliding-mode triboelectric generator according to an embodiment of the present disclosure, electric charge is continuously generated while two charged bodies move, thereby being capable of continuously generating voltage. Accordingly, power efficiency increases.

In addition, the sliding-mode triboelectric generator having a tilted-face structure, exhibits increased voltage and, while the charged bodies move, continuous voltage generation, compared to the sliding-mode triboelectric generator having a plane structure.

The sliding-mode triboelectric generator having a tilted-face structure is advantages in that a force obtained by multiplying the force external (F=mg) by cos è acts in a direction, in which two charged bodies are in close contact, due to the tilted-face structure, and the two charged bodies are not spaced apart from each other while the charged bodies move due to the acting force.

Due to the advantages, the sliding-mode triboelectric generator having a tilted-face structure advantageously exhibits continuous voltage generation while charged bodies move, and increased power efficiency of frictional electricity due to the continuous voltage generation, compared to the sliding-mode triboelectric generator having a plane structure.

Accordingly, since a triboelectric generator using the contact charging phenomenon generates frictional electricity only when two charged bodies come into contact, the sliding-mode triboelectric generator having a tilted-face structure is advantageous in that output voltage is also generated when charged bodies move, compared to a conventional CS-mode triboelectric generator.

Referring to FIG. 3, in both the FT mode structure with a plane structure and the FT mode structure with a tilted-face structure, voltage is continuously generated even while friction occurs. However, referring to FIG. 3, the FT mode structure with a tilted-face structure exhibits improved output voltage, compared to that of the FT mode structure with a plane structure.

In addition, an output voltage of the tilted-face structure maintains contact between two charged bodies by a force obtained by multiplying external force (F=mg) by cos $\ominus$, and allows to move and rub along a tilted face by a force obtained by multiplying external force (F=mg) by sin $\ominus$. In addition, due to the aforementioned advantage, contact between the charged bodies may be maintained even while the charged bodies move and, at the same time, a power allowing the charged bodies to rub against each other by contact force may be obtained.

FIGS. 4a to 4d illustrate multiple tilted-face structures of high-power sliding-mode triboelectric generators 410 and 420 according to embodiments of the present disclosure.

Figure 4A:
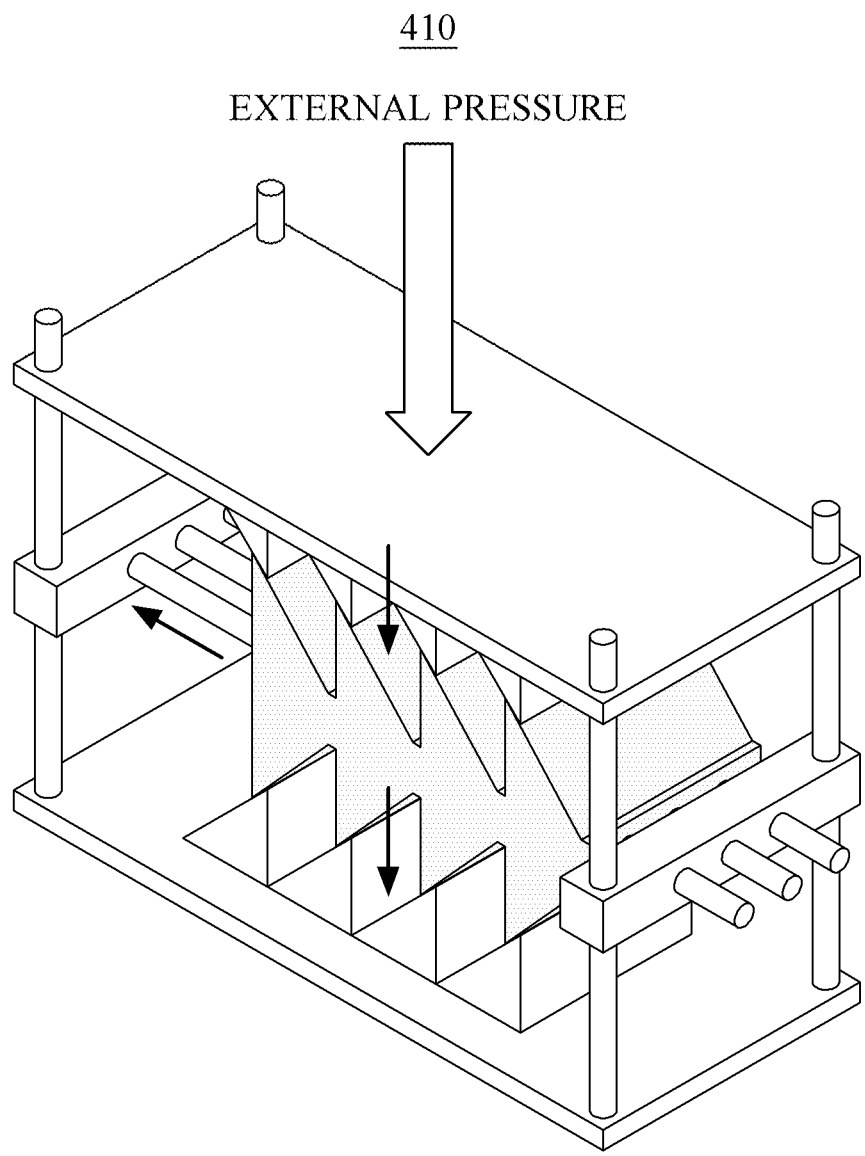
FIGS. 4a to 4d illustrate multiple tilted-face structures of high-power sliding-mode triboelectric generators according to embodiments of the present disclosure.
Figure 4B:
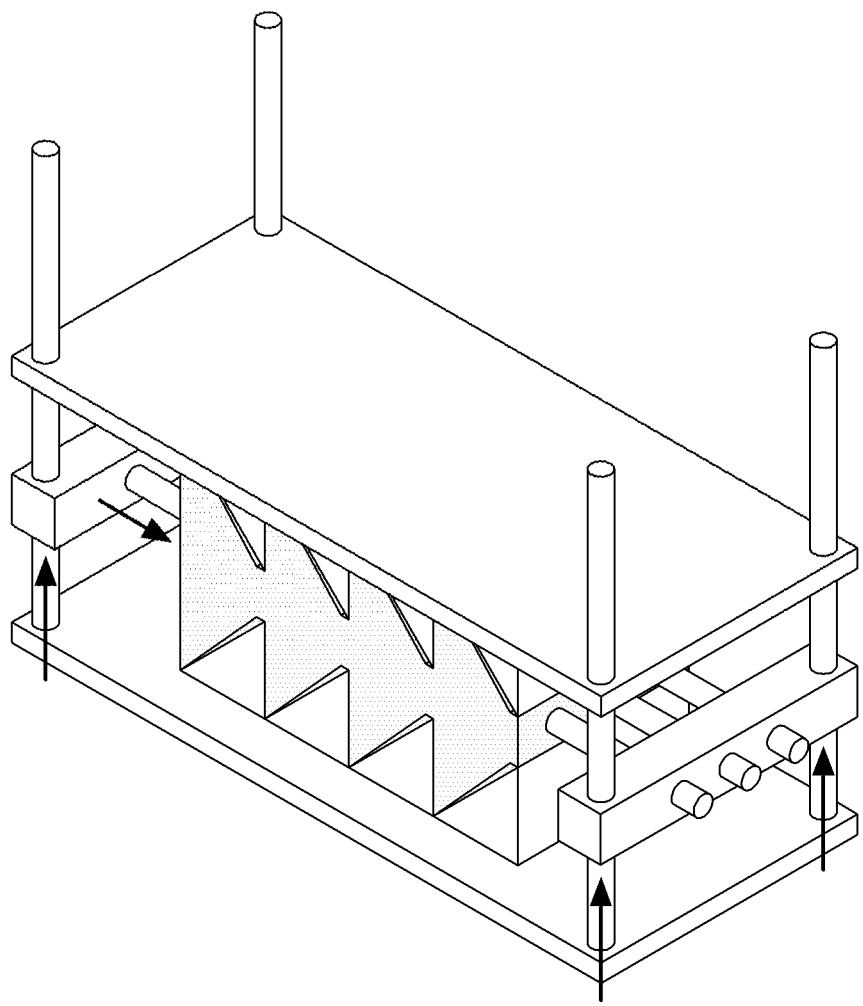

In particular, FIG. 4a and FIG. 4b schematically illustrate high-power sliding-mode triboelectric generators 410 and 420 according to embodiments of the present disclosure including multiple tilted-face structures. Referring to FIGS. 4a and 4b, each of the high-power sliding-mode triboelectric generators 410 and 420 according to embodiments of the present disclosure includes an upper plate, a middle plate, and a lower plate.

A friction surface 430 of each of the upper plate, the middle plate and the lower plate may be a flat surface or a curved shape of several millimeters to improve power generation efficiency.

Figure 4C:
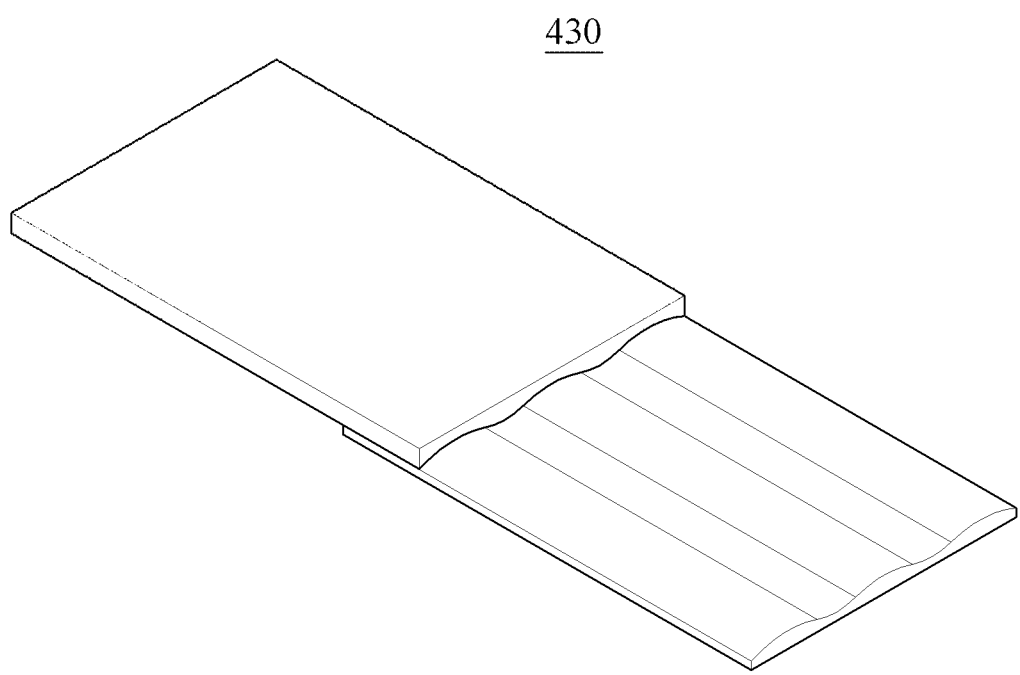

Referring to FIG. 4c, the curved shapes of the friction surfaces 430 of the upper plate, the middle plate and the lower plate should be the same. The curved shape may be a wave shape as in FIG. 4c, and the friction surface 430 may have various types of structures such as a right angle shape and a triangular shape.

For example, the friction surface 430 of each of the upper plate, the middle plate and the lower plate may have at least one pattern of a comb pattern, a checkered pattern, a stripe pattern, a protruding pattern, and a wave pattern. However, the present disclosure is not limited to the patterns, and various patterns may be applied to and formed on the friction surface 430.

The pattern of the friction surface 430 may increase a contact area of the friction surface 430 on which frictional electricity is generated, thereby improving power generation.

Figure 4D:
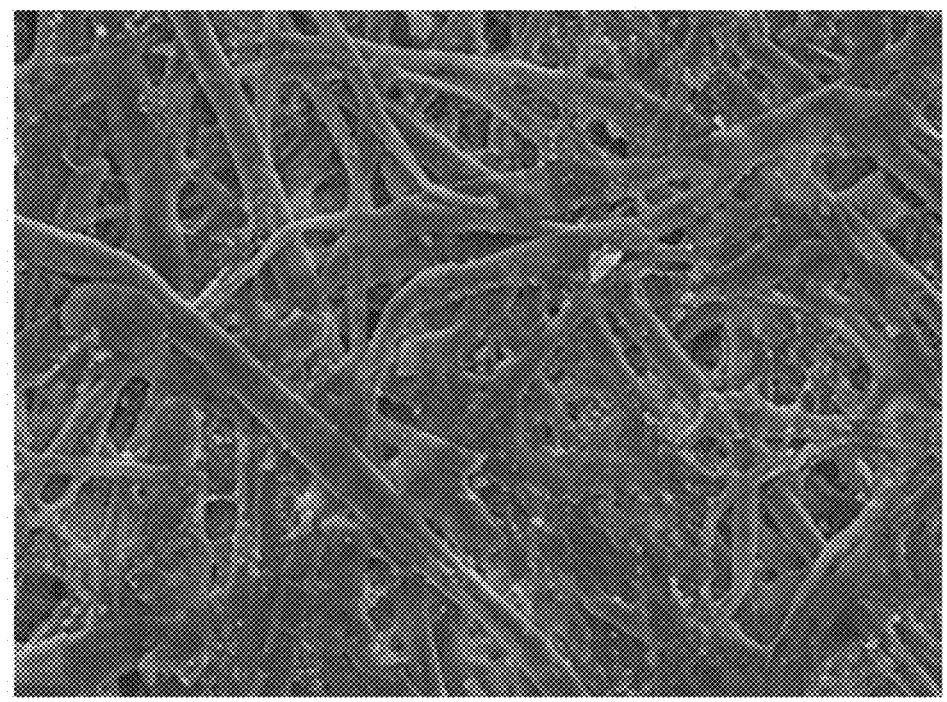

The image shown in FIG. 4d illustrates a nanostructure formed on the friction surface 430 of each of the upper plate, the middle plate and the lower plate. The nanostructure may further increase a friction surface area to improve power generation.

The nanostructure of the friction surface 430 may be artificially formed or may be formed by a self-assembly method.

Referring to FIG. 4a, when external force is applied to the upper plate, the upper plate moves in a direction in which external force is applied, and the middle plate moves in a direction in which the external force is applied while moving in a direction vertical to the external force.

Referring to FIG. 4b, restoring force of the spacer is transferred to the upper plate in a direction opposite to external force so that the upper plate is restored to the initial position thereof, restoring force of the horizontal spacer is transferred to the middle plate in a direction vertically opposite to external force while restoring force of the spacer is transferred to the middle plate in an opposite direction to the external force so that the middle plate is restored to an initial position thereof.

Each of the multiple tilted-face structures according to embodiments of the present disclosure shown in FIGS. 4a and 4b may include an upper plate including a plurality of tilted faces; a lower plate including the same tilted faces as those of the upper plate; and a middle plate that corresponds to the upper plate and the lower plate and includes a plurality of tilted faces.

Friction occurs in the plurality of tilted faces of the multiple tilted-face structures according to embodiments of the present disclosure shown in FIGS. 4a and 4b, and electric charge is generated from the friction to collect power.

In addition, power generation efficiency may be increased by adjusting the number of the tilted faces of the multiple tilted-face structures according to embodiments of the present disclosure shown in FIGS. 4a and 4b.

In addition, power generation efficiency may be increased by adjusting the angle of the tilted faces of the multiple tilted-face structures according to embodiments of the present disclosure shown in FIGS. 4a and 4b.

The power generation efficiency of the multiple tilted-face structures according to embodiments of the present disclosure shown in FIGS. 4a and 4b may be increased by laminating a plurality of substrates in three or more layers.

Figure 5:
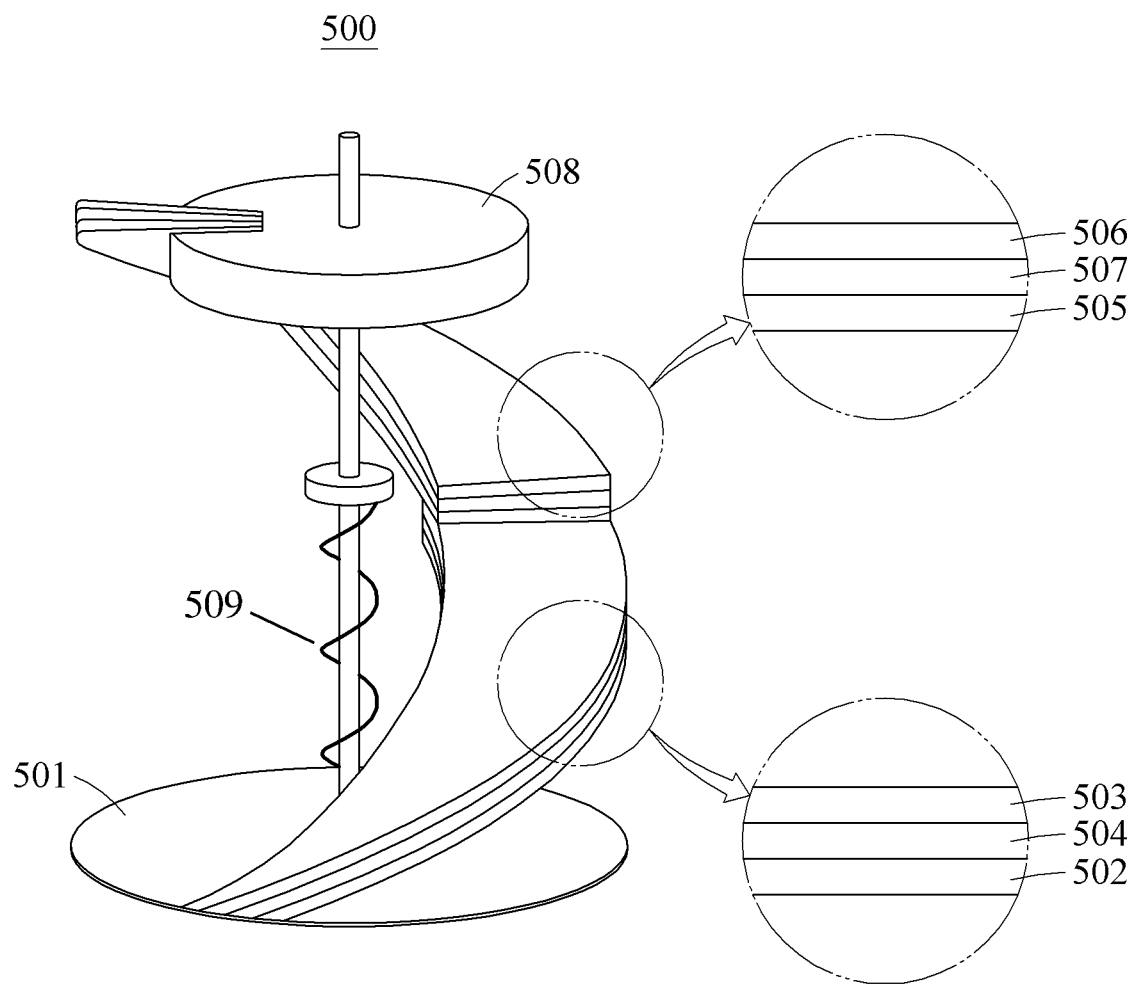
FIG. 5 illustrates an overall operation of a high-power sliding-mode triboelectric generator according to an embodiment of the present disclosure.

FIG. 5 illustrates an overall operation of a high-power sliding-mode triboelectric generator 500 according to an embodiment of the present disclosure The high-power sliding-mode triboelectric generator 500 according to an embodiment of the present disclosure includes a substrate 501, a positive electrode 502 formed to be tilted at a predetermined angle on the substrate 501 and to have a spiral shape, a positively charged body 503 provided on the positive electrode 502, configured to rotate in a spiral direction when compressed by external force, and configured to transfer positive charges generated due to friction to the positive electrode 502, a negatively charged body 505 located to be opposite to the positively charged body 503, a negative electrode 506 provided on the nega-tively charged body, and at least one spacer 509 formed between the positively charged body 503 and the negatively charged body 505.

In addition, the negative electrode 506 may be connected to an upper substrate 508 while forming a predetermined angle with the upper substrate 508.

The substrate 501 has been described above with reference to FIG. 1 and, as such, description thereof is omitted.

The positive electrode 502 may be formed to have a single-layer structure or a multi-layer structure.

The positive electrode 502 of the high-power sliding-mode triboelectric generator 500 according to an embodiment of the present disclosure may be formed to be tilted at a predetermined angle on the substrate 501 to have a spiral shape, and may transfer positive charges, generated due to friction, to a load.

The positively charged body 503 may be provided on the positive electrode 502, may rotate in a spiral direction when compressed by external force, and may transfer positive charges, generated due to friction, to the positive electrode 502.

The positively charged body 503 may include at least one of glass, mica, nylon, wool, fur, lead, silk, aluminum, paper, cotton, steel, wood, amber, epoxy, nickel, copper, silver, gold and sulfur, but the present disclosure is not limited thereto.

The positively charged body 503 may rub against the positively charged body by external force, thereby generating frictional electricity. Here, the positively charged body 503 may be provided between the positive electrode 502 and the negative electrode 506 and may include a polymer material and a nanomaterial.

Surface roughness of a polymer material and a nanomaterial may be adjusted by self-alignment or artificially, and the polymer material and the nanomaterial may be formed to have a regular or irregular pattern as in FIG. 4d.

The number of positive charges generated in the positively charged body 503 may be controlled by adjusting the thickness and area of the positively charged body 503. In addition, the number of positive charges generated in the positively charged body 503 may be controlled by adjusting an angle tilted from the substrate.

Here, the angle may include a range of 30 to 70 degrees, preferably a range of 45 to 55 degrees in which energy collection efficiency is highest.

More particularly, as the thickness of the positively charged body 503 increases, more positive charges may be generated and trapped, and the number of positive charges generated in the positively charged body 503 due to friction may increase.

In addition, the positively charged body 503 may be provided between the positive electrode 502 and the positively charged body 503, and may further include a first functional layer 504 for preventing loss of positive charges.

The first functional layer 504 may prevent loss of positive charges generated inside the positively charged body 503 and on a surface thereof due to friction between the positively charged body 503 and the negatively charged body 505.

In addition, the first functional layer 504 may increase a moving efficiency of positive charges, generated in the positively charged body 503 due to friction between the positively charged body 503 and the negatively charged body 505, to the positive electrode connected to the positively charged body 503.

Strong positive charge trapping property and a large surface area of the first functional layer 504 may prevent positive charges in the positively charged body 503 from being leaking and being lost to the outside in a process in which the positively charged body 503 generates positive charges due to friction, and may improve the efficiency of the triboelectric generator 500 by reducing leaked positive charges.

The first functional layer 504 may include at least one of a polymer material and a nanomaterial.

The types of the polymer material or the nanomaterial have been described above with reference to FIG. 1. Accordingly, descriptions thereof are omitted.

The negatively charged body 505 may include at least one of silicon rubber, Teflon, polydimethylsiloxane, polyvinyl chloride, polyethylene terephthalate, polypropylene, polyethylene, polyurethane, cellophane tape, polystyrene, saran, polyvinyl alcohol, and polymethylmethacrylate, but the present disclosure is not limited thereto.

In addition, the negatively charged body 505 may include at least one of graphene, graphene oxide, $MoS_2$, $MoSe_2$, $WS_2$, and $WSe_2$ and may trap negative charges of the negatively charged body 505.

The negatively charged body 505 may rub against the positively charged body 503 due to external force to generate frictional electricity. Here, the negatively charged body 505 may be provided between the positive electrode 502 and a negative electrode 506 and may include a polymer material and a nanomaterial.

The number of negative charges generated by the negatively charged body 505 may be controlled by the thickness and area of the negatively charged body 505. In addition, the negatively charged body 505 may control the number of negative charges generated through adjustment of an angle tilted from the substrate.

More particularly, as the thickness of the negatively charged body 505 increases, more negative charges may be generated and trapped and the number of negative charges generated in the positively charged body 503 due to friction may increase.

In addition, the negatively charged body 505 may be provided between the negative electrode 506 and the positively charged body 503 and may further include a second functional layer 507 for preventing loss of negative charges.

The second functional layer 507 may prevent loss of positive charges generated inside the negatively charged body 505 and on a surface thereof due to friction between the positively charged body 503 and the negatively charged body 505.

In addition, the second functional layer 507 may increase a moving efficiency of negative charges, generated in the negatively charged body 505 due to friction between the positively charged body 503 and the negatively charged body 505, to the negative electrode connected to the positively charged body 503.

Strong negative charge trapping property and a large surface area of the second functional layer 507 may prevent negative charges in the negatively charged body 505 from being leaking and being lost to the outside in a process in which the negatively charged body 505 generates negative charges due to friction, and may improve the efficiency of the triboelectric generator by reducing leaked negative charges.

The second functional layer may include at least one of a polymer material and a nanomaterial.

The high-power sliding-mode triboelectric generator 500 according to an embodiment of the present disclosure may include at least one spacer 509 formed between the positively charged body 503 and the negatively charged body 505, is formed of an elastic body, and configured to maintain a gap between the positively charged body 503 and the negatively charged body 505.

The spacer 509 may be made of a spring or an elastic body. The spacer 509 may be formed to have an appropriate length to separate the negatively charged body 505 and the positively charged body 503 from each other.

For example, preferably, the spacer 509 may be a spring, and at least one spacer 509 may be provided at an edge between the positively charged body 503 with a spiral shape and the negatively charged body 505 with a spiral shape.

For example, the spacer 509 may be a spring, and at least one spacer 509 may be provided at the center of the positively charged body 503 with a spiral shape and the negatively charged body 505 with a spiral shape.

With regard to the phenomenon of triboelectric power generation through contact and friction, positive charge is induced on one surface and negative charge is induced on the other surface due to contact charging when two different surfaces come into contact.

In addition, when the two surfaces are separated, a potential difference is created by the previously induced charge, and the flow of electrons between the electrodes connected to the two surfaces is induced to reach equilibrium.

In addition, when the two surfaces are brought back close together after reaching equilibrium, a potential difference opposite to the previous potential difference is formed and electron flow in a direction opposite to the previous electron flow direction is induced. Based on such an operation principle, repeated contact and separation of the two surfaces cause repetitive generation of the voltage and current.

Here, electrons may refer to negative charges, and holes may refer to positive charges.

In the case of the high-power sliding-mode triboelectric generator 500 according to an embodiment of the present disclosure, there is no potential difference between the positive electrode and the negative electrode in a basic state, so that a surface of each of the negatively charged body 505 and the positively charged body 503 is maintained in a state in which there is no electric charge.

However, when external force is applied to the high-power sliding-mode triboelectric generator 500 according to an embodiment of the present disclosure so that the negatively charged body 505 and the positively charged body 503 rub against each other, electric charges may move to a surface of each of the negatively charged body 505 and the positively charged body 503 by the frictional electricity effect due to friction.

According to the frictional electricity generation process, the negatively charged body 505 has strong frictional negative polarity, and negative charge and positive charge may be respectively induced on a surface of the negatively charged body 505 and a surface of the positively charged body 503.

In addition, when the negatively charged body 505 and the positively charged body 503 of the high-power sliding-mode triboelectric generator 500 according to an embodiment of the present disclosure are spaced apart from each other again, the dipole moment becomes stronger, and a strong potential difference may be generated between the positive electrode and the negative electrode. Accordingly, negative charges flow from a negative potential to a positive potential so that the triboelectric generator 500 operates.

In addition, negative charges and positive charges may be respectively generated due to friction between the positively charged body 503 and the negatively charged body 505, the negative charges generated in the negatively charged body 505 may move to the negative electrode connected to the negatively charged body 505, and the positive charges generated in the positively charged body 503 may move to the positive electrode connected to the positively charged body 503.

In addition, the positively charged body 503 and the negatively charged body 505 that have been rubbed against each other due to external force are restored to original (initial) positions thereof through the spacer 509 to convert the potential energy of the restored positively charged body 503 and negatively charged body 505 and the elastic energy of the spacer 509 into electrical energy.

The sliding-mode triboelectric generator 500 according to an embodiment of the present disclosure may be applied to a self-powered electronic device or a wearable device.

For example, friction surfaces of the positively charged body 503 and the negatively charged body 505 may be a flat surface or a curved shape of several millimeters to improve power generation efficiency.

The curved shape of the friction surface of the positively charged body 503 should be the same as that of the friction surface of the negatively charged body. The curved shape may be a wave shape, and the friction surface may have various types of structures such as a right angle shape and a triangular shape.

The pattern of the friction surface may increase a contact area of the friction surface on which frictional electricity is generated, thereby improving power generation.

In addition, the rotary generator 500 having a spiral friction surface may increase a travel distance, at which friction occurs, and a power generation time due to frictional power generation, compared to a linear generator.

In addition, a nanostructure may be included in the friction surfaces of the positively charged body and the negatively charged body, and power generation may be improved by further increasing a friction surface area including the nanostructure.

The nanostructure of the friction surface may be artificially formed or may be formed by a self-assembly method.

A high-power sliding-mode triboelectric generator according to an embodiment of the present disclosure having a structure of collecting electric power in a reciprocating motion in which external force is applied can provide improved power generation efficiency, compared to a conventional contact separation (CS)-mode triboelectric generator.

In addition, the high-power sliding-mode triboelectric generator according to an embodiment of the present disclosure can continuously produce electric charge due to tilted faces therein during a reciprocating motion, compared to the CS mode triboelectric generator that generates electric charge only at the end of a reciprocating motion.

In addition, the high-power sliding-mode triboelectric generator according to an embodiment of the present disclosure can be installed on the floor of a place, where there is a lot of foot or vehicle traffic, to collect electric power.

As apparent from the above description, the present disclosure provides a high-power sliding-mode triboelectric generator that has a structure of collecting electric power in a reciprocating motion in which external force is applied and, accordingly, can provide improved power generation efficiency, compared to a conventional contact separation (CS)-mode triboelectric generator; and a method of manufacturing the high-power sliding-mode triboelectric generator.

In addition, the present disclosure provides a high-power sliding-mode triboelectric generator capable of continuously producing electric charge due to tilted faces therein during a reciprocating motion, compared to the CS mode triboelectric generator that generates electric charge only at the end of a reciprocating motion; and a method of manufacturing the high-power sliding-mode triboelectric generator.

Further, the present disclosure provides a high-power sliding-mode triboelectric generator capable of being installed on the floor of a place, where there is a lot of foot or vehicle traffic, to collect electric power; and a method of manufacturing the high-power sliding-mode triboelectric generator.

Although exemplary embodiments of the present invention have been disclosed for illustrative purposes, those skilled in the art will appreciate that various modifications, additions and substitutions are possible, without departing from the scope and spirit of the invention as disclosed in the accompanying claims. For example, a proper result may be achieved even if the techniques described above are implemented in an order different from that for the disclosed method, and/or disclosed constituents such as a system, structure, device and circuit are coupled to or combined with each other in a form different from that for the disclosed method or replaced by other constituents or equivalents.

It should be understood, however, that there is no intent to limit the invention to the embodiments disclosed, rather, the invention is to cover all modifications, equivalents, and alternatives falling within the spirit and scope of the invention as defined by the claims.

What is claimed is:

1. A sliding-mode triboelectric generator, comprising:
   a substrate;
   a positive electrode formed on the substrate and configured to transfer positive charges generated due to friction to a load;
   a positively charged body provided on the positive electrode, formed to be tilted at a predetermined angle from the substrate, configured to move in a plane direction of the substrate, and configured to transfer the positive charges generated due to the friction to the positive electrode;
   a negatively charged body located to be opposite to the positively charged body, formed to be tilted at the predetermined angle from the substrate, and, when rubbed against the positively charged body due to external force, configured to maintain contact with the positively charged body through a difference between a direction of the external force and a tilted friction direction to continuously generate negative charges while the friction occurs;
   a negative electrode provided on the negatively charged body, configured to support the negatively charged body, and configured to transfer the negative charges, generated in the negatively charged body due to the friction, to the load; and
   at least one spacer formed between the positively charged body and the negatively charged body, having an elastic body, and configured to maintain an interval between the positively charged body and the negatively charged body,
   wherein positions of the positively charged body and the negatively charged body are restored to initial positions thereof through the at least one spacer, and potential energy of the restored positively and negatively charged bodies and elastic energy of the at least one spacer are converted into electrical energy.

2. The sliding-mode triboelectric generator according to claim 1, further comprising a first functional layer provided between the positively charged body and the positive electrode and configured to prevent loss of the positive charges.

3. The sliding-mode triboelectric generator according to claim 1, further comprising a second functional layer provided between the negatively charged body and the negative electrode and configured to prevent loss of the negative charges.

4. The sliding-mode triboelectric generator according to claim 1, wherein the positively charged body comprises at least one of glass, mica, nylon, wool, fur, lead, silk, aluminum, paper, cotton, steel, wood, amber, epoxy, nickel, copper, silver, gold, and sulfur.

5. The sliding-mode triboelectric generator according to claim 1, wherein the negatively charged body comprises at least one of silicon rubber, polytetrafluoroethylene, polydimethylsiloxane, polyvinyl chloride, polyethylene terephthalate, polypropylene, polyethylene, polyurethane, cellophane tape, polystyrene, saran, polyvinyl alcohol, and polymethylmethacrylate.

6. The sliding-mode triboelectric generator according to claim 5, wherein the negatively charged body comprises at least one of graphene, graphene oxide, $MoS_2$, $MoSe_2$, $WS_2$, and $WSe_2$, and is configured to trap the negative charges of the negatively charged body.

7. The sliding-mode triboelectric generator according to claim 1, wherein a range of the predetermined angle is 30 to 70 degrees.

8. A method of manufacturing a sliding-mode triboelectric generator, the method comprising:
  forming a substrate;
  forming a positive electrode formed on the substrate and configured to transfer positive charges generated due to friction to a load;
  forming a positively charged body provided on the positive electrode, formed to be tilted at a predetermined angle from the substrate, configured to move in a plane direction of the substrate, and configured to transfer the positive charges generated due to the friction to the positive electrode;
  forming a negatively charged body located to be opposite to the positively charged body, formed to be tilted at the predetermined angle from the substrate, and, when rubbed against the positively charged body due to external force, configured to maintain contact with the positively charged body through a difference between a direction of the external force and a tilted friction direction to continuously generate negative charges while the friction occurs;
  forming a negative electrode provided on the negatively charged body, configured to support the negatively charged body, and configured to transfer the negative charges, generated in the negatively charged body due to the friction, to the load; and
  forming at least one spacer formed between the positively charged body and the negatively charged body, having an elastic body, and configured to maintain an interval between the positively charged body and the negatively charged body,
  wherein positions of the positively charged body and the negatively charged body are restored to initial positions thereof through the at least one spacer, and potential energy of the restored positively and negatively charged bodies and elastic energy of the at least one spacer are converted into electrical energy.

9. The method according to claim 8, wherein the positively charged body comprises at least one of glass, mica, nylon, wool, fur, lead, silk, aluminum, paper, cotton, steel, wood, amber, epoxy, nickel, copper, silver, gold, and sulfur.

10. The method according to claim 8, wherein the negatively charged body comprises at least one of silicon rubber, polytetrafluoroethylene, polydimethylsiloxane, polyvinyl chloride, polyethylene terephthalate, polypropylene, polyethylene, polyurethane, cellophane tape, polystyrene, saran, polyvinyl alcohol, and polymethylmethacrylate.

11. The method according to claim 10, wherein the negatively charged body comprises at least one of graphene, graphene oxide, $MoS_2$, $MoSe_2$, $WS_2$, and $WSe_2$, and is configured to trap negative charges of the negatively charged body.

12. The method according to claim 8, wherein a range of the angle is 30 to 70 degrees.

13. A sliding-mode triboelectric generator, comprising:
  a substrate;
  a positive electrode formed in a spiral shape to be tilted at a predetermined angle on the substrate and configured to transfer positive charges generated due to friction to a load;
  a positively charged body provided on the positive electrode, configured to rotate in a spiral direction when compressed by external force, and configured to transfer the positive charges generated due to friction to the positive electrode;
  a negatively charged body located to be opposite to the positively charged body, formed in a spiral shape at the predetermined angle on the substrate, configured to perform a spiral motion while rubbing against the positively charged body by external force, and configured to generate negative charges while maintaining contact with the positively charged body during the spiral motion;
  a negative electrode provided on the negatively charged body, configured to support the negatively charged body, and configured to transfer the negative charges, generated in the negatively charged body due to the friction, to the load; and
  at least one spacer formed between the positively charged body and the negatively charged body, having an elastic body, and configured to maintain an interval between the positively charged body and the negatively charged body,
  wherein positions of the positively charged body and the negatively charged body are restored to initial positions thereof through the at least one spacer, and potential energy of the restored positively and negatively charged bodies and elastic energy of the spacer are converted into electrical energy.

14. The sliding-mode triboelectric generator according to claim 13, further comprising:
  a first functional layer provided between the positively charged body and the positive electrode and configured to prevent a loss of the positive charges; and
  a second functional layer provided between the negatively charged body and the negative electrode and configured to prevent a loss of the negative charges.

15. The sliding-mode triboelectric generator according to claim 13, wherein a range of the angle is 30 to 70 degrees.

16. The sliding-mode triboelectric generator according to claim 13, wherein a friction surface of each of the positively charged body and the negatively charged body comprises a nanostructure configured to increase a friction surface area.

17. The sliding-mode triboelectric generator according to claim 16, wherein the nanostructure is formed artificially or by a self-assembly method.

\* \* \* \* \*